(12) United States Patent
Amanai

(10) Patent No.: US 6,927,925 B2
(45) Date of Patent: Aug. 9, 2005

(54) IMAGING OPTICAL SYSTEM

(75) Inventor: Takahiro Amanai, Hachiohji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/796,128

(22) Filed: Mar. 10, 2004

(65) Prior Publication Data

US 2004/0179274 A1 Sep. 16, 2004

(30) Foreign Application Priority Data

Mar. 12, 2003 (JP) ........................................ 2003-066815

(51) Int. Cl.[7] .............................. G02B 9/00; G02B 9/14
(52) U.S. Cl. ...................................... 359/740; 359/785
(58) Field of Search ................................ 359/690, 705, 359/716, 738, 740, 753, 785, 790

(56) References Cited

U.S. PATENT DOCUMENTS 6,560,043 B1  5/2003  Saito et al. .................. 359/785
6,804,067 B2 * 10/2004  Sato .......................... 359/790

FOREIGN PATENT DOCUMENTS

| JP | 05-188284 | 7/1993 |
| JP | 07-027974 | 1/1995 |
| JP | 09-288235 | 11/1997 |
| JP | 11-052227 | 2/1999 |
| JP | 2001-083409 | 3/2001 |

* cited by examiner

Primary Examiner—Georgia Epps
Assistant Examiner—Alicia M. Harrington
(74) Attorney, Agent, or Firm—Kenyon & Kenyon

(57) ABSTRACT

An imaging optical system comprising, in order from the object side, a first positive meniscus lens having a convex surface on the object side, an aperture stop, a second negative meniscus lens having a convex surface on the image side, and a third positive lens having an object side aspherical surface which has curvature lowered toward a marginal portion of the aspherical surface and an image side surface which has curvature enhanced toward the marginal portion of the aspherical surface. This imaging optical system allows its performance to be degraded due to manufacturing errors and exhibits high performance even when the optical system is configured compact.

10 Claims, 5 Drawing Sheets

IMAGING OPTICAL SYSTEM

BACKGROUND OF THE INVENTION

1. a) Field of the Invention

The present invention relates to an imaging optical system which is to be used in combination with a solid stage image pickup device such as a CCD or a CMOS. The present invention relates to an imaging optical system which is to be utilized in a compact camera, a monitor camera or the like to be incorporated, for example, with a digital still camera, a digital video camera, a portable telephone or a personal computer.

2. b) Description of the Prior Art

There have recently been prevailing electronic cameras which photograph objects using solid-state image pickup devices such as a CCD and a CMOS in place of silver salt films. Out of such electronic cameras, image pickup unit which are to be incorporated with portable computers, portable telephones and the like in particular require compactness and light weight.

As an image pickup optical system which is to be used in such an image pickup unit, there is conventionally known an optical system consisting of a lens or two lenses. As apparent from an aberration theory, however, such an optical system cannot correct curvature of field, thereby making it hopeless to have high optical performance.

On the other hand, a CCD hinders a micro lens from exhibiting a sufficient light condensing capability when an offaxial light bundle emerging from an imaging optical system is incident at too large an angle relative to an image surface. The CCD therefore produces a phenomenon that brightness is extremely changed from a central portion of an image to a marginal portion of the image. Since this phenomenon is associated with a location of an exit pupil of the optical system, the location of the exit pupil is important for design of the optical system. Furthermore, the exit pupil is in a conjugate relation to an aperture stop. A location of the aperture stop is therefore important for an optical system which consists of a small number of lenses.

As optical system which is configured taking this point into consideration, there is a type of optical system in which a stop is disposed before a first lens (lens on a most object side) or between the first lens and a second lens. Known as conventional examples of this type optical system are those which are disclosed by patent literatures mentioned below:

[Patent literature No. 1] Japanese Patent Kokai Publication No. Hei 5-188284

[Patent literature No. 2] Japanese Patent Kokai Publication No. Hei 9-288235

[Patent literature No. 3] Japanese Patent Kokai Publication No. 2001-83403

[Patent literature No. 4] Japanese Patent Kokai Publication No. Hei 11-5227

Out of these optical systems, each of the optical system disclosed by literatures No. 1 and No. 2 uses a first positive lens which is a biconvex lens and a second negative lens which is a biconcave lens. This optical system therefore allows optical performance to be remarkably degraded when the lenses are eccentric from each other. In other words, the optical system requires a greatly high assembling precision for exhibiting high performance.

Furthermore, the optical system disclosed by the literature No. 3 uses a first positive lens which has a concave surface on the object side and a circumferential portion of the lens hinders the optical system from having a short total length.

Furthermore, the optical system disclosed by the literature No. 4 uses a first positive lens which has a meniscus shape convex on the object side and a second lens which has a meniscus shape convex on the image side. Accordingly, this optical system overcomes a difficulty of enlargement in a field angle.

SUMMARY OF THE INVENTION

An imaging optical system according to the present invention consists, in order from the object side, of a first positive lens having a convex surface on the object side, an aperture stop, a second negative lens having a convex surface on the image side and a third positive lens; the third lens having an object side surface which is configured as an aspherical surface having curvature lowered toward a marginal portion of the aspherical surface and an image side surface which is configured as an aspherical surface having curvature enhanced toward a marginal portion of the aspherical surface.

The present invention relates also to an optical apparatus which uses the above descried imaging optical system.

DETAILED DESCRIPTION OF THE PREFERRED EMBODIMENTS

Figure 1:
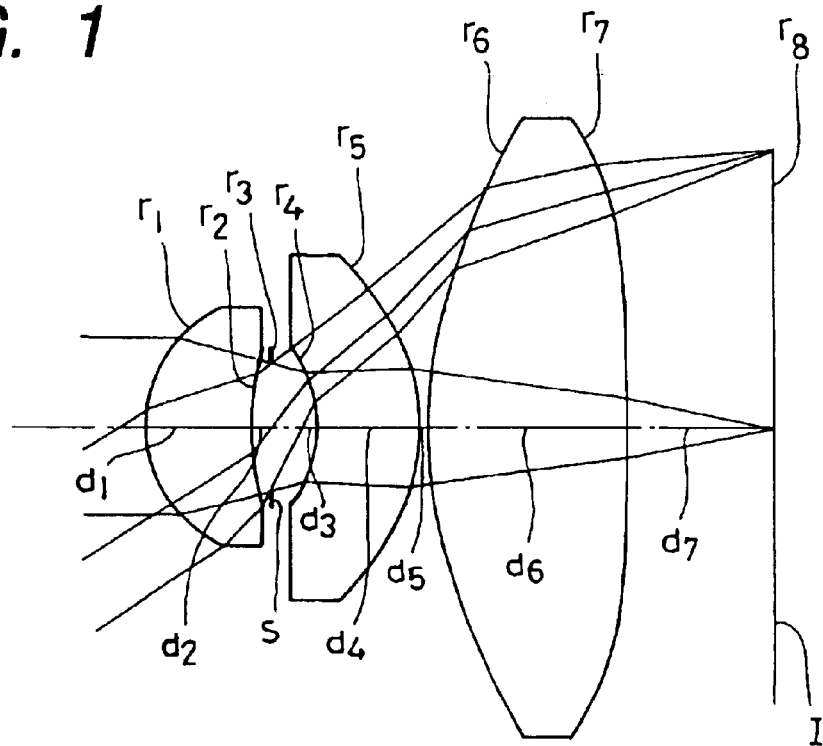
FIG. 1 is a sectional view illustrating a composition of a first embodiment of the present invention.

An imaging optical consists, in order from the object side, of a first positive lens having a convex surface on the object side, an aperture stop, a second negative lens having a convex surface on the image side and a third positive lens; the third lens having an object side surface which is configured as an aspherical surface having curvature lowered toward a marginal portion of the aspherical surface and an image side surface which is configured as an aspherical surface having curvature enhanced toward a marginal portion of the aspherical surface.

Taking optical performance and compactness into consideration, the imaging optical system is configured so as to consist of three lenses of the first, second and third lenses as described above. It is apparent that performance of an optical system can be further enhanced by composing the optical system of four lenses. However, an additional lens inevitably enlarges a total thickness of the optical system, increases a number of airspaces and widens a frame space, thereby enlarging the optical system. When the optical system is composed of lenses in a number not larger than two, in contrast, curvature of field cannot be reduced as described above with reference to the prior art, whereby performance is degraded at a marginal portion. For reasons described above, the imaging optical system is configured so as to consist of three lenses as described above.

When an image pickup device such as a CCD is to be used, it is further necessary for obtaining favorably light condensing performance on a surface of the image pickup device to reduce an angle of incidence on the image pickup device. It is desirable for meeting this requisite to dispose an aperture stop or an image of an aperture stop at a location far from an image surface.

Furthermore, it is necessary for an optical system having a large field angle to reduce production of distortion and chromatic aberration at a marginal portion. It is desirable for meeting this requisite to dispose an aperture stop at a location with regard to which a power distribution of the optical system is symmetrical.

For two reasons described above, the imaging optical system is configured so as to dispose the aperture stop between the first lens and the second lens as described above. In other words, the imaging optical system is configured placing emphasis on a large field angle and a telecentric characteristic.

For the imaging optical system, the first lens is configured as a meniscus lens which has a convex surface on the object side and positive power, and the second lens is configured as a meniscus lens which has a convex surface on the image side and negative power. Accordingly, surfaces of the first and second lenses have positive, negative, negative and positive refractive power in order from the object side. A surface which has negative refractive power is divided into refracting surfaces of two lenses (the first and second lenses) as described above. This division makes it possible to minimize performance variation when the lenses are eccentric from each other.

Next, the third lens of the imaging optical system is important for reducing an angle of incidence on the image pickup device.

For this reason, the third lens has the object side surface which is configured as the aspherical surface having the curvature lowered toward the marginal portion of the aspherical surface and the image side surface which is configured as the aspherical surface having the curvature enhanced toward the marginal portion of the aspherical surface as described above. The aspherical surfaces allow marginal rays to have small angle of incidence on the image pickup device. These surfaces have such shapes to minimize an angle between a ay incident on the third lens and a ray emerging from the third lens, that is, an amplitude. By configuring the refracting surfaces of the third lens as described above, it is possible to allow the marginal rays to be incident on the image pickup device at small angles while suppressing production of aberrations.

The imaging optical system described above can correct aberrations such as spherical aberration and coma when the imaging optical system satisfies the following condition (1):

$$-100 < (r1r^2/f1)/(r2f^2/f2) < -1 \tag{1}$$

wherein a reference symbol r1r represents a radius of curvature on an image side surface of the first positive lens, a reference symbol r2f designates a radius of curvature on an object side surface of the second negative lens, a reference symbol f1 denotes a focal length of the first positive lens and a reference symbol f2 represents a focal length of the second negative lens.

The condition (1) is required for sharing negative power between the first lens and the second lens and the imaging optical system which satisfies the condition (1) is capable of preventing performance from being degraded by eccentricity of the lenses from each other.

If $(r1r^2/f1)/(r2f^2/f2)$ is larger than an upper limit of −1 of the condition (1), the object side surface of the second lens will have too weak power, thereby making the imaging optical system incapable of preventing performance from being degraded by eccentricity between the lenses. If $(r1r^2/f1)/(r2f^2/f2)$ is smaller than a lower limit of −100 of the condition (1), in contrast, the object side surface of the second lens will have too strong power and produce spherical aberration and coma in amounts too large for correction by other surfaces.

It is more desirable to satisfy, in place of the above mentioned condition (1), the following condition (1-1):

$$-60 < (r1r^2/f1)/(r2f^2/f2) < -10 \tag{1-1}$$

Furthermore, it is much more desirable to satisfy, in place of the condition (1), the following condition (1-2):

$$-40 < (r1r^2/f1)/(r2f^2/f2) < -20 \tag{1-2}$$

A total length can be shortened by configuring the imaging optical system so as to satisfy the following condition (2):

$$0.1 < f1/f < 3.0 \tag{2}$$

wherein a reference symbol f1 represents a focal length of the first positive lens and a reference symbol f designates a focal length of the optical system as a whole.

In order to shorten the total length of an optical system, it is necessary to compose the optical system so that a principal point of the optical system is situated at a location rather shifted on the object side. Power of the first lens is important to meet this requisite. The condition (2) defines a focal length of the first lens.

If f1/f is larger than an upper limit of 3.0 of the condition (2), the first lens will have too weak power, thereby making it difficult to shorten the total length. If f1/f is smaller than a lower limit of 0.1 of the condition (2), the first lens will have too strong power, whereby aberrations produced by the first lens cannot be corrected by the second lens. Accordingly, it will be difficult to obtain the imaging optical system having favorable optical performance.

It is more desirable to satisfy, in place of the condition (2), the following condition (2-1):

$$0.5 < f1/f < 2.0 \tag{2-1}$$

Furthermore, it is much more desirable to satisfy, in place of the condition (2), the following condition (2-2):

$$0.8 < f1/f < 1.2 \tag{2-2}$$

It is preferable for the imaging optical system which has the above described composition to satisfy the following condition (3):

$$1.0 < f23/f < 4.0 \tag{3}$$

wherein a reference symbol f23 represents a total focal length of the second lens and the third lens, and a reference symbol f designates a focal length of the optical system as a whole.

In the imaging optical system, the second negative lens has a diverging function which is disadvantageous for angles of incidence of rays on an image surface. A composition of the third lens which is disposed next to the second negative lens is therefore important.

If f23/f is larger than an upper limit of 4.0 of the condition (3), the second lens will have too strong negative power, thereby making the angles of incidence too large on the image surface. If f23/f is smaller than a lower limit of 1.0 of the condition (3), is contrast, the second lens will have too weak negative power, whereby a Petzval's sum will be inclined remarkably on a positive side and it will be impossible to obtain favorable optical performance.

It is more desirable to satisfy, in place of the condition (3), the following condition (3-1).

$$1.3 < f23/f < 3.0 \tag{3-1}$$

Furthermore, it is much more desirable to satisfy, in place of the condition (3), the following condition (3-2):

$$1.7 < f23/f < 2.3 \tag{3-2}$$

In the imaging optical system, the first lens is disposed before the aperture stop, whereas the second and third lenses are disposed after the aperture stop. Accordingly, offaxial rays pass symmetrically with regard to the aperture stop as a central point. It is therefore important for the imaging optical system to correct lateral chromatic aberration and distortion.

It is preferable for correction of the lateral chromatic aberration and distortion to satisfy the following condition (4):

$$-10.0 < f1/f23 < 3.0 \tag{4}$$

wherein a reference symbol f1 represents a focal length of the first positive lens and a reference symbol f23 designates a total focal length of the second negative lens and the third positive lens.

If f1/f23 is larger than an upper limit of 3.0 or (f1/f23) is smaller than a lower limit of −10.0 of the condition (4), the lateral chromatic aberration and the distortion will be overcorrected or undercorrected, whereby marginal performance will be degraded at a marginal portion of the image surface. Furthermore, it is more preferable to satisfy, in place of the condition (4), the following condition (4-1):

$$-1.0 < f1/f23 < 1.0 \tag{4-1}$$

In addition, it is much more desirable to satisfy, in place of the condition (4), the following condition (4-2):

$$-0.4 < f1/f23 < 0.7 \tag{4-2}$$

In order to favorably correct longitudinal chromatic aberration for making the imaging optical system achromatic as a whole, it is desirable to satisfy the following condition (5):

$$0.1 < (v2-v1)/(v3-v2) < 8.0 \tag{5}$$

wherein reference symbols v1, v2 and v3 represent Abbe's numbers of the first lens, the second lens and the third lens respectively.

If (v2−v1)/(v3−v2) is larger than an upper limit of 8.0 or is smaller than a lower limit of 0.1 of the condition (5), the longitudinal chromatic aberration will be overcorrected or undercorrected. As a result, it will be difficult to obtain good performance at a central portion of the image surface in either case.

Furthermore, it is more preferable to satisfy, in place of the condition (5), the following condition (5-1):

$$0.3 < (v2-v1)/(v3-v2) < 3.0 \tag{5-1}$$

In addition, it is much more preferable to satisfy, in place of the condition (5), the following condition (5-2):

$$0.5 < (v2-v1)/(v3-v2) < 1.5 \tag{5-2}$$

Furthermore, it is preferable to configure the imaging optical system according to the present invention so that a maximum angle of incidence of a principal ray on the image surface satisfies the following condition (6):

$$10° < \alpha < 40° \tag{6}$$

When a CCD is used as an image pickup device, an offaxial light bundle which emerges from an optical system and is incident on the image surface at too large angle makes brightness different between a central portion and a marginal portion of an image. When an offaxial light bundle is incident on an image at a small angle, on the other hand, such a problems of brightness is lessoned. In this case, however, a total length of the optical system is unpreferably prolonged.

For a reason described above, it is preferable to satisfy the condition (6) mentioned above.

If α is larger than an upper limit of 40° of the condition (6), an angle of incidence on the CCD will be too large, thereby lowering brightness on the marginal portion of the image. If α is smaller than a lower limit of 10° at the condition (6), in contrast, the imaging optical system will unpreferably have too large a total length.

It is more preferable to satisfy, in place of the condition (6), the following condition (6-1):

$$12° < \alpha < 35° \tag{6-1}$$

Furthermore, it is much more preferable to satisfy, in place of the condition (6), the following condition (6-2):

$$15° < \alpha < 25° \tag{6-2}$$

It is desirable to configure the imaging optical system according to the present invention so as to satisfy the following condition (7):

$$0.50[\mu m] < Fno/P[\mu m] < 2.00[\mu m] \tag{7}$$

wherein a reference symbol Fno represents an open aperture F number of the optical system and a reference symbol P designates an interval between picture elements on an image pickup device.

If Fno/P has a value which is larger than an upper limit of the above mentioned condition (7), the optical system will be too dark or the interval between the picture elements will be too small, whereby an amount of rays per picture element will be small. Accordingly, a shutter speed will be slowed down, whereby a camera may be vibrated by hands or noise may be increased for along exposure time.

If Fno/P has a value which is smaller than a lower limit of the condition (7), on the other hand, the interval between the picture elements will be too large, thereby making it impossible to obtain data making use of a large number of picture elements.

It is desirable to satisfy, in place of the above mentioned condition (7), the following condition (7-1):

$$0.60[\mu m] < Fno/P[\mu m] < 1.17[\mu m] \quad (7\text{-}1)$$

It is more desirable to satisfy, in place of the above mentioned condition (7) or condition (7-1), the following condition (7-2):

$$0.65[\mu m] < Fno/P[\mu m] < 1.10[\mu m] \quad (7\text{-}2)$$

Furthermore, it is desirable for the imaging optical system according to the present invention to use a single plastic lens or a plurality of plastic lenses and satisfy the following condition (8):

$$0.02 < ML/TL < 0.33 \quad (8)$$

wherein a reference symbol TL represents a total length of the optical system and a reference symbol ML designates a minimum axial thickness of the plastic lens.

If <L/TL has a value larger than an upper limit of the condition (8), the minimum axial thickness of the plastic lens will be too large for the total length, whereby it will be impossible to impart a sufficient center thickness for a glass lens and a workability of the glass lens will be lowered. If ML/TL has a value smaller than a lower limit of the condition (8), on the other hand, the plastic lens will have too small a minimum axial thickness and plastic resin cannot penetrate smoothly into a molding tool at a molding stage, whereby a stress will constitute a cause for birefringence or a long time which is required for the molding will lower a productivity.

It is desirable to satisfy, in place of the above mentioned condition (8), the following condition (8-1):

$$0.04 < ML/TL < 0.23 \quad (8\text{-}1)$$

It is more desirable to satisfy, in place of the above mentioned condition (8) or condition (8-1), the following condition (8-2):

$$0.06 < ML/TL < 0.17 \quad (8\text{-}2)$$

Now, description will be made of an example of photographing apparatus which uses the imaging optical system according to the present invention.

Description will be made of embodiments of the imaging optical system according to the present invention. First through third embodiments of the present invention are optical systems which have compositions illustrated in FIG. 1 through FIG. 3 and numerical data listed below:

Embodiment 1
f = 4.5, F/2.4, IH = 3.0, ω = 34°

| Surface No. | Radius of curvature | Airspace | Refractive index | Abbe's number |
|---|---|---|---|---|
| Object surface | ∞ | ∞ | | |
| 1 | Aspherical surface [1] | 1.07 | 1.5256 | 56.4 |
| 2 | Aspherical surface [2] | 0.22 | | |
| 3 | Stop surface | 0.47 | | |
| 4 | Aspherical surface [3] | 1.08 | 1.6889 | 31.1 |
| 5 | Aspherical surface [4] | 0.10 | | |
| 6 | Aspherical surface [5] | 2.11 | 1.5256 | 56.4 |
| 7 | Aspherical surface [6] | 1.51 | | |
| Image | ∞ | | | |

| surface | |
|---|---|
| Aspherical surface [1] | |
| Radius of curvature | 1.55 |
| k | $3.5003 \times 10^{-1}$ |
| a | $-2.4605 \times 10^{-4}$ |
| Aspherical surface [2] | |
| Radius of curvature | 3.60 |
| k | 8.3062 |
| a | $8.0001 \times 10^{-3}$ |
| Aspherical surface [3] | |
| Radius of curvature | −1.43 |
| k | 1.0099 |
| a | $3.2457 \times 10^{-2}$ |
| Aspherical surface [4] | |
| Radius of curvature | −2.12 |
| k | $-6.4049 \times 10^{-1}$ |
| a | $8.6965 \times 10^{-4}$ |
| Aspherical surface [5] | |
| Radius of curvature | 4.87 |
| k | $-9.9710 \times 10^{-1}$ |
| a | $-9.1569 \times 10^{-4}$ |
| Aspherical surface [6] | |
| Radius of curvature | −25.72 |
| k | $-3.5117 \times 10^{-4}$ |
| a | $-5.0615 \times 10^{-3}$ |

Embodiment 2
f = 4.5, F/2.4, IH = 3.0, ω = 34°

| Surface No. | Radius of curvature | Airspace | Refractive index | Abbe's number |
|---|---|---|---|---|
| Object surface | ∞ | ∞ | | |
| 1 | Aspherical surface [1] | 0.83 | 1.5831 | 59.4 |
| 2 | Aspherical surface [2] | 0.21 | | |
| 3 | Stop surface | 0.90 | | |
| 4 | Aspherical surface [3] | 0.41 | 1.5839 | 30.2 |
| 5 | Aspherical surface [4] | 0.10 | | |
| 6 | Aspherical surface [5] | 2.21 | 1.5256 | 56.4 |
| 7 | Aspherical surface [6] | 1.56 | | |
| Image surface | ∞ | | | |

| Aspherical surface [1] | | |
|---|---|---|
| Radius of curvature | 1.84 | |
| k | $4.0305 \times 10^{-1}$ | |
| a | $1.0299 \times 10^{-5}$ b | $-6.1723 \times 10^{-4}$ |
| Aspherical surface [2] | | |
| Radius of curvature | 4.36 | |
| k | $-4.0146 \times 10^{-1}$ | |
| a | $8.8825 \times 10^{-3}$ b | $1.8630 \times 10^{-3}$ |
| Aspherical surface [3] | | |
| Radius of curvature | −0.82 | |
| k | $-6.3680 \times 10^{-1}$ | |
| a | $1.7662 \times 10^{-1}$ b | $-9.4120 \times 10^{-3}$ |
| Aspherical surface [4] | | |
| Radius of curvature | −1.29 | |

-continued

| | |
|---|---|
| k | $-6.8734 \times 10^{-1}$ |
| a | $3.7877 \times 10^{-2}$  b  $2.7515 \times 10^{-2}$ |

Aspherical surface [5]

| | |
|---|---|
| Radius of curvature | 2.53 |
| k | $-1.1928 \times 10^{-1}$ |
| a | $3.9115 \times 10^{-3}$  b  $-2.2073 \times 10^{-4}$ |

Aspherical surface [6]

| | |
|---|---|
| Radius of curvature | $-22.59$ |
| k | $-9.5216 \times 10^{-3}$ |
| a | $-6.1641 \times 10^{-3}$  b  $-7.7722 \times 10^{-5}$ |

Embodiment 3
f = 4.5, F/2.4, IH = 3.0, ω = 34°

| Surface No. | Radius of curvature | Airspace | Refractive index | Abbe's number |
|---|---|---|---|---|
| Object surface | ∞ | ∞ | | |
| 1 | Aspherical surface [1] | 0.92 | 1.5163 | 64.1 |
| 2 | Aspherical surface [2] | 0.17 | | |
| 3 | Stop surface | 1.03 | | |
| 4 | Aspherical surface [3] | 0.50 | 1.5839 | 30.2 |
| 5 | Aspherical surface [4] | 0.10 | | |
| 6 | Aspherical surface [5] | 2.45 | 1.5891 | 61.2 |
| 7 | Aspherical surface [6] | 1.51 | | |
| Image surface | ∞ | | | |

Aspherical surface [1]

| | |
|---|---|
| Radius of curvature | 1.75 |
| k | $-7.8407 \times 10^{-1}$ |
| a | $2.2435 \times 10^{-2}$  b  $7.7442 \times 10^{-4}$ |

Aspherical surface [2]

| | |
|---|---|
| Radius of curvature | 4.61 |
| k | 6.7021 |
| a | $-3.4841 \times 10^{-3}$  b  $-1.1327 \times 10^{-2}$ |

Aspherical surface [3]

| | |
|---|---|
| Radius of curvature | $-0.75$ |
| k | $-8.2755 \times 10^{-1}$ |
| a | $1.2962 \times 10^{-1}$  b  $-2.9707 \times 10^{-1}$  c  $1.9988 \times 10^{-1}$ |
| d | $-9.5096 \times 10^{-2}$ |

Aspherical surface [4]

| | |
|---|---|
| Radius of curvature | $-1.30$ |
| k | $-1.1964$ |
| a | $-5.1736 \times 10^{-2}$  c  $-9.9580 \times 10^{-3}$  c  $9.0645 \times 10^{-3}$ |

Aspherical surface [5]

| | |
|---|---|
| Radius of curvature | 2.36 |
| k | $-1.2943 \times 10^{-1}$ |
| a | $3.2511 \times 10^{-3}$  b  $-1.6528 \times 10^{-4}$ |

Aspherical surface [6]

| | |
|---|---|
| Radius of curvature | $-32.41$ |
| k | $-2.6405 \times 10^{-4}$ |
| a | $-4.4808 \times 10^{-3}$  b  $-2.8346 \times 10^{-5}$ |

In the numerical data listed above, a reference symbol f represents a focal length of the imaging optical system as a whole, a reference symbol F designates an F number, a reference symbol IH denotes an image height and a reference symbol ω represents half a field angle. Furthermore, radii of curvature are specified as radii of curvature on surfaces $r_1$, $r_2$, ... shown in the drawings, and airspaces are specified as values of $d_1$, $d_2$, ... shown in the drawings.

Lengths such as the focal length f, the radii of curvature $r_1$, $r_2$, ... airspaces $d_1$, $d_2$, ... are specified as values in a unit of millimeter.

Out of the embodiments described above, an imaging optical system according to the first embodiment has a composition illustrated in FIG. 1. The imaging optical system consists, in order from the object side, of a first positive lens ($r_1$ to $r_2$) which has a convex surface on the object side and has two aspherical surfaces, an aperture stop ($r_3$), a second negative meniscus lens ($r_4$ to $r_5$) which has a convex surface on the image side and has two spherical surfaces and a third positive lens which has a biconvex shape and has two aspherical surfaces.

The first lens and the third lens of the imaging optical system according to the first embodiment are made of a plastic material, whereas the second lens of this imaging optical system is made of glass. Out of these lenses, the first and third plastic lens are made of polyolefin based zeonex.

The optical system according to the first embodiment uses, on an image surface of the optical system, an image pickup which measures ⅓ inch and has 1,300,000 picture elements (interval between picture elements 3.6 µm).

Figure 2:
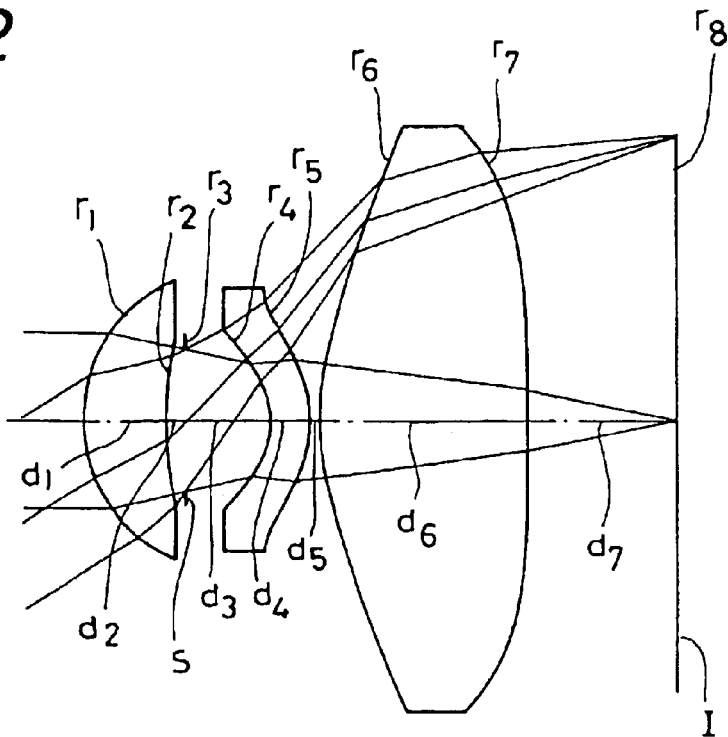
FIG. 2 is a sectional view illustrating a composition of a second embodiment of the present invention.
Figure 3:
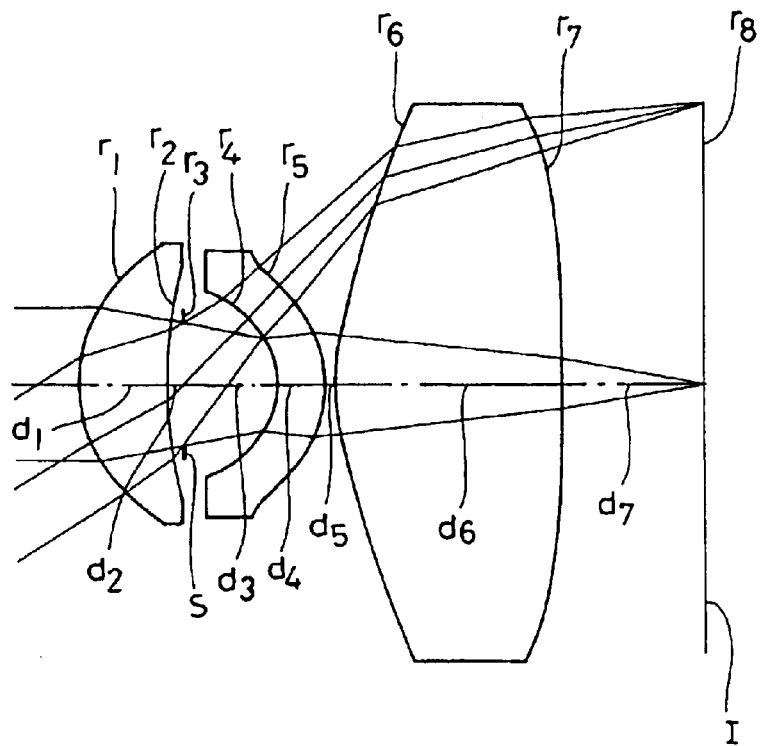
FIG. 3 is a sectional view illustrating a composition of a third embodiment of the present invention.
Figure 4:
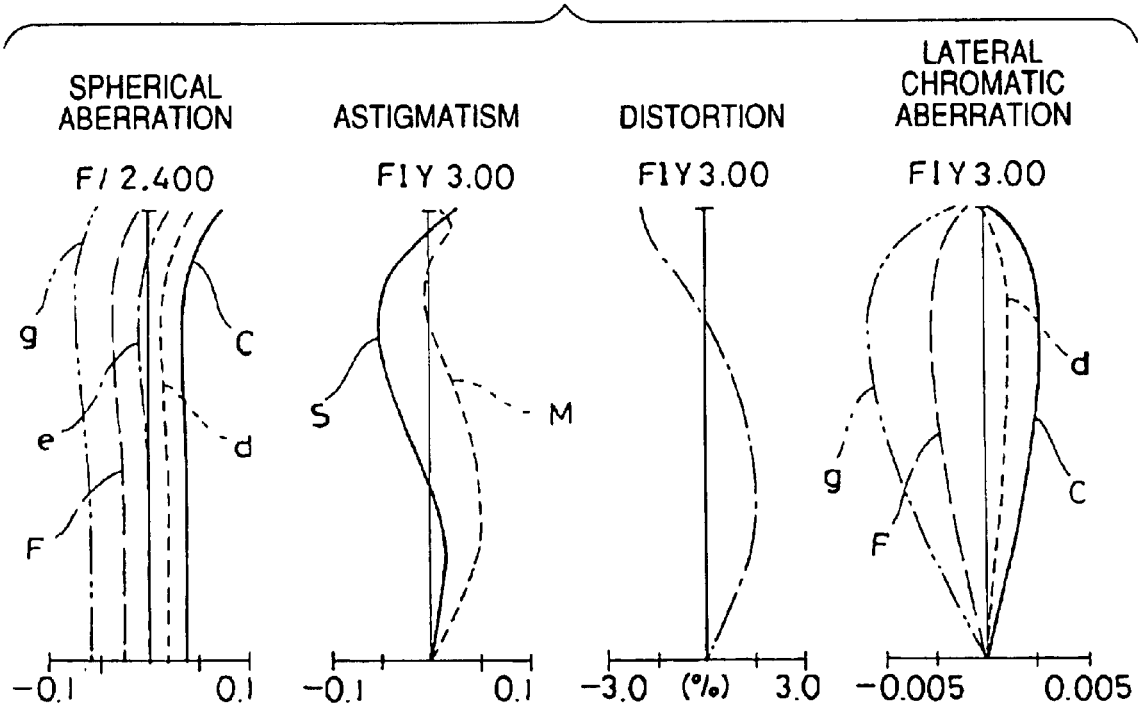
FIG. 4 shows diagrams illustrating aberration characteristics of the first embodiment.
Figure 5:
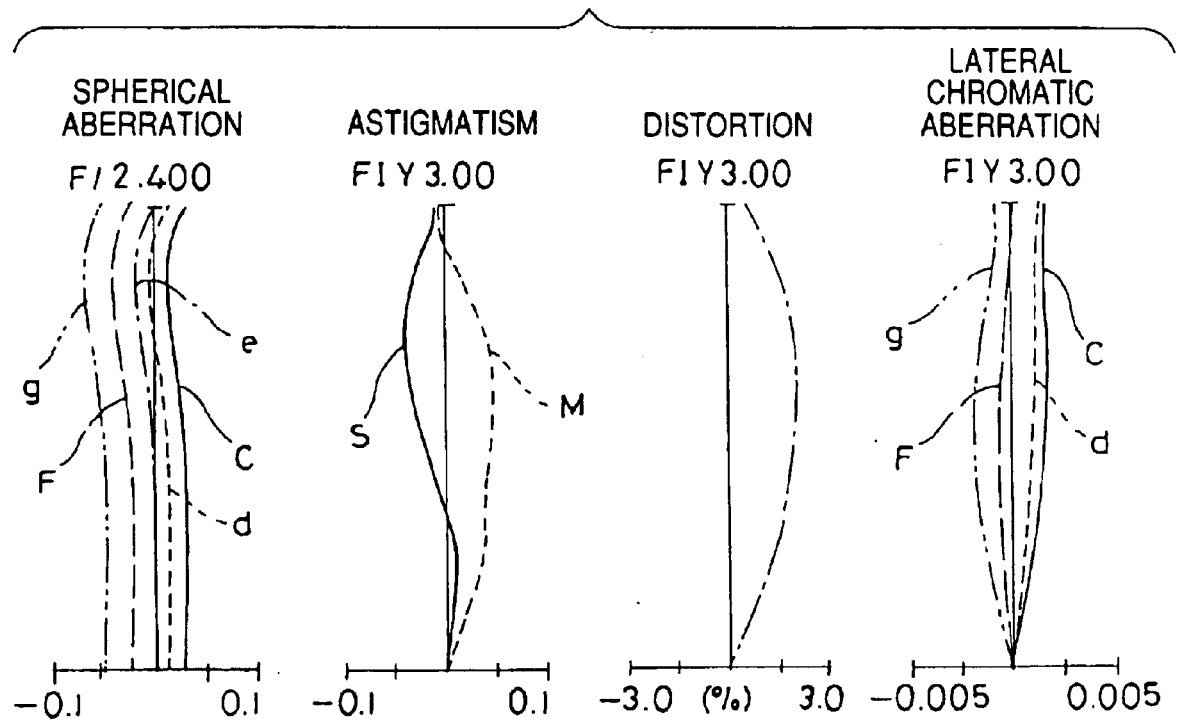
FIG. 5 shows diagrams illustrating aberration characteristics of the second embodiment.
Figure 6:
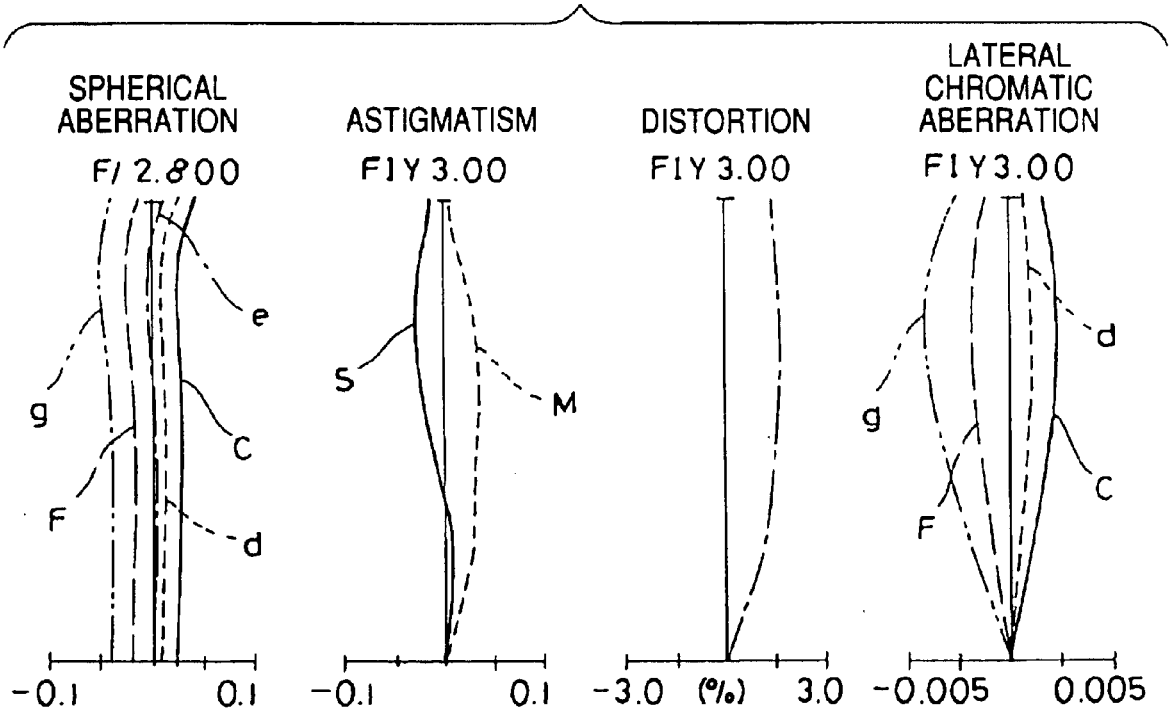
FIG. 6 shows diagrams illustrating aberration characteristics of the third embodiment.

The second embodiment has a composition shown in FIG. 2, in which an imaging optical system consists, in order from the object side, of a first positive lens ($r_1$ to $r_2$) which has a convex surface on the object side and has two aspherical surfaces, an aperture stop ($r_3$), a second negative lens which has a convex surface on the image side and has two aspherical surfaces and a third positive lens high has a biconvex shape and has two aspherical surfaces. The first lens of the imaging optical system according to the second embodiment is made of glass, whereas the second and third lenses of this imaging optical system are made of a plastic material. The second lens is made of polycarbonate and the third lens is made of amorphous polyolefin based zeonex.

The optical system according to the second embodiment uses, on an image surface of the optical system, an image pickup device which measures ⅓ inch and has 2,000,000 picture elements (interval between picture elements 3.0 µm).

Furthermore, an imaging optical system according to the third embodiment consists, in order from the object side, of a first positive meniscus lens which has a convex surface on the object side and has two aspherical surfaces, a second negative meniscus lens which has a convex surface on the image side and has two aspherical surfaces and a third positive lens which has a biconvex shape and has two aspherical surfacers. The first and third lenses of the imaging optical system according to the third embodiment are made of glass, whereas the second lens is made of a plastic material. The plastic material of the second lens is polycarbonate.

The optical system according to the third embodiment uses, on an image surface of the optical system, an image pickup device which measures ⅓ inch and has 3,000,000 picture elements (interval between picture elements 2.4 µm).

These embodiments have values which are listed in a table shown below as those which correspond to the conditions (1) through (9).

| | Embodiment 1 | Embodiment 2 | Embodiment 3 |
|---|---|---|---|
| $(r_1 r^2/f_1)/(r_2 f^2/f_2)$ | $-25.65$ | $-33.36$ | $-34.89$ |
| $f_1/f$ | 0.97 | 1.07 | 1.07 |

-continued

|  | Embodiment 1 | Embodiment 2 | Embodiment 3 |
|---|---|---|---|
| f23/f | 2.01 | 2.17 | 1.81 |
| f1/f23 | 0.48 | 0.49 | 0.59 |
| (ν2 − ν1)/(ν3 − ν2) | 1.00 | 1.11 | 1.09 |
| α | 20.00 | 20.00 | 17.00 |
| Fno/P | 0.67 | 0.80 | 1.00 |
| ML/TL | 0.16 | 0.07 | 0.07 |

[μm]

As apparent from this table, each embodiment satisfies the conditions (1) through (7).

Though some of the lenses of these embodiments are made of the plastic materials, these lenses may be made of glass. By using a glass material which has a refractive index higher than those of the plastic materials selected for the embodiments, for example, it is possible to configure the imaging optical systems which have higher performance. Furthermore, it is effective for correction of chromatic aberration to use a lowly dispersive special glass material. When the lenses are to be made of a plastic material, performance degradation due to environmental variations can be reduced by selecting a lowly hygroscopic material.

Furthermore, a flare stop may be used in addition to the aperture stop for cutting off unwanted rays which produce ghost and flare. The flare stop may be disposed at any location before the first lens, in a section from the first lens to the aperture stop, in a section from the aperture stop to the second lens, in a section from the second lens to the third lens or in a section between the third lens and the image surface. A function of a flare stop can be obtained by a method which uses a frame to cut off the rays producing flare. Furthermore, another frame member may be disposed to cut off the rays producing flare. Furthermore, a flare stop may be composed by printing, coating or seal bouding direct on the imaging optical system (an optical element such as a lens). A flare stop may have any shape such as a circle, an ellipse, a rectangle, a polygon or a range enclosed by a functional curve. In addition, it is possible to use a member which cuts off not only detrimental rays but also a light bundle which produces flare at a marginal portion of the image surface.

Furthermore, each lens may have an antireflection coating to lasses ghost and flare. A multi coating can effectively lessen ghost and flare. Moreover, an infrared cut coat may be effected on a lens surface, a cover glass plate and the like.

Furthermore, the lenses may be moved for focusing. The focusing can be carried out by moving a lens system as a whole or some lenses of the lens system on the object side or the image side.

Furthermore, lowered brightness at a marginal portion of the image surface may be lessened by shifting micro lenses of a CCD. It is possible to prevent lowered brightness at the marginal portion of the image surface, for example, by changing designs of micro lenses of a CCD in conjunction with angles of incidence of rays at different image heights. Moreover, lowered brightness at the marginal portion of the image surface may be corrected by image processing.

When a direction in which rays travel along an optical axis is taken as an x axis and a direction perpendicular to the optical axis is taken as a y axis, shapes of the aspherical surfaces used in the embodiments are expressed by the following formula:

$$x=(y^2/r)/[1+\{1-(1+k)(y/r)^2\}^{1/2}]+ay^4+by^6+cy^8+dy^{10}+\ldots$$

wherein a reference symbol r represents a radius of curvature on a reference sphere, a reference symbol k designates a conical coefficient, and reference symbols a, b, c, d, . . . denote aspherical coefficients.

The present invention makes it possible to realize an imaging optical system which has performance little degraded due to manufacturing errors and exhibits high performance even when the optical system is configured compact.

Figure 7:
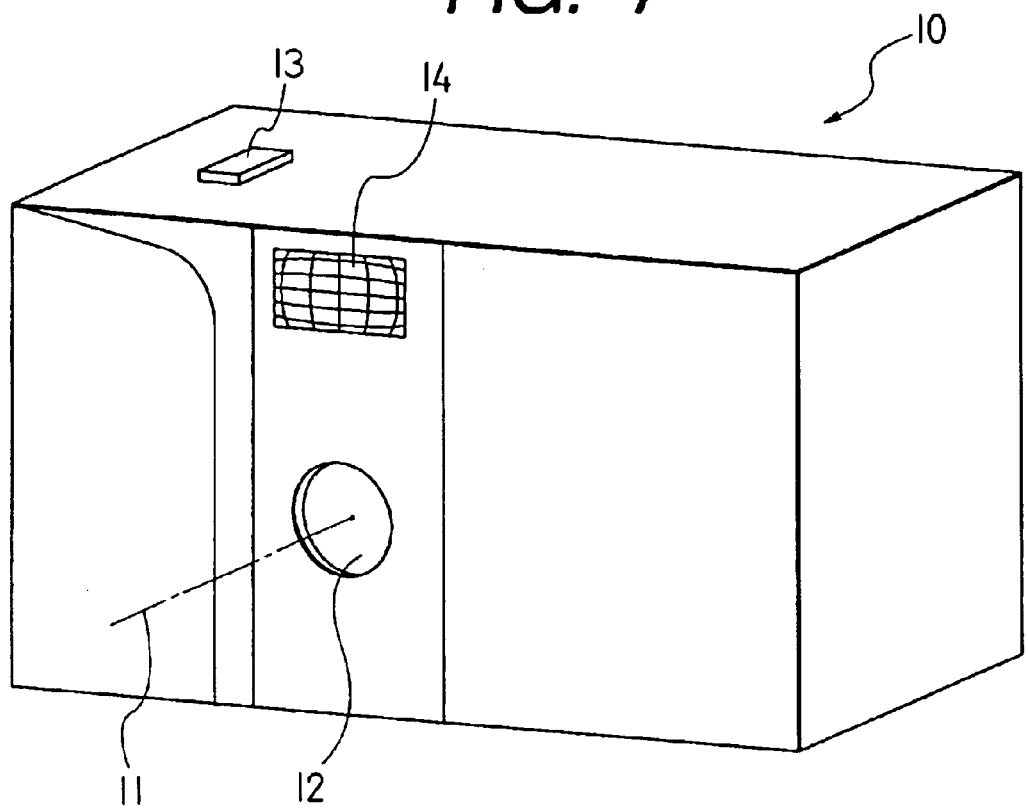
FIG. 7 is a perspective view showing an appearance of an electronic camera using the imaging optical system according to the present invention as seen from a front side.
Figure 8:
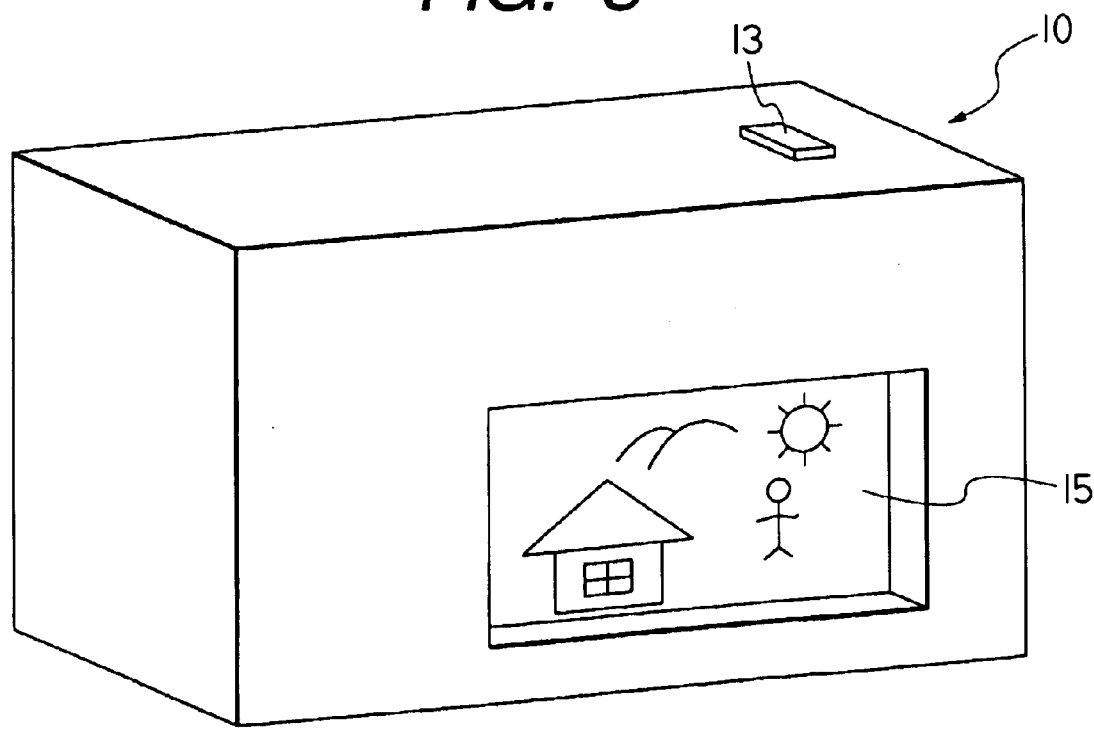
FIG. 8 is perspective view of the above described electronic camera as seen from a rear side.

FIGS. 7 and 8 are diagrams showing an electronic camera which incorporates the imaging optical system according to the present invention. FIG. 7 and FIG. 8 are perspective views showing appearances of the electronic camera as seen from a front side and from a rear side respectively. A reference numeral 10 represents an electronic camera which comprises an imaging optical system 12 according to the present invention having a photographing optical path 11, a shutter 13, a flash lamp 14 and an liquid crystal monitor 15 as shown in these drawings. When the shutter 13 disposed on a top of the camera 10 is depressed, an object is photographed in conjunction with the shutter depression through an objective lens system which is the imaging optical system according to the present invention. The imaging optical system forms an image of the object on an image pickup device chip such as a CCD through an infrared out filter.

Figure 9:
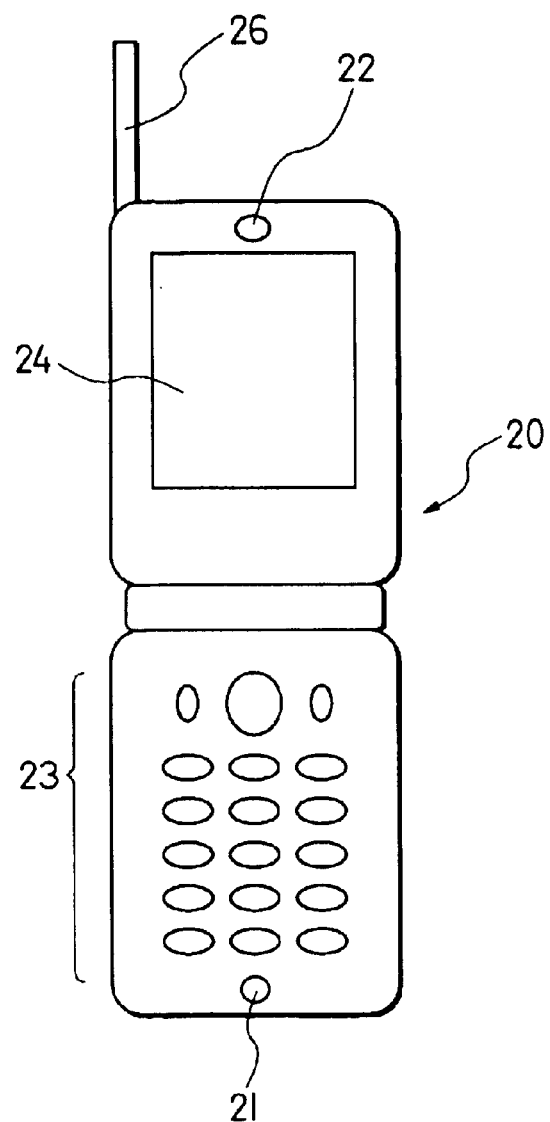
FIG. 9 is a front view of a portable telephone using the imaging optical system according to the present invention.
Figure 10:
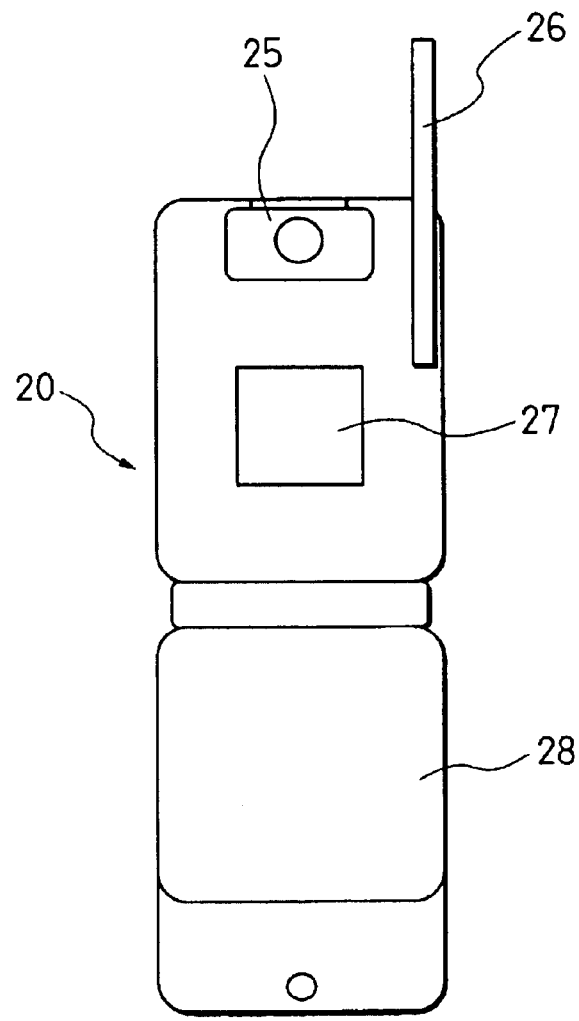
FIG. 10 is a rear view of the above described portable telephone.

Next, FIGS. 9 and 10 show a telephone, a portable telephone which can be carried conveniently in particular, as an example of information processing apparatus incorporating the imaging optical system according to the present invention.

FIG. 9 is a front view of a portable telephone 20 and FIG. 10 is a rear view of the portable telephone 20.

As shown in FIGS. 9 and 10, the portable telephone 20 comprises a microphone unit 21 into which a voice of an operator is to be input as information, a speaker unit 22 for outputting a voice of a communicating mate, an operation unit 23 to be used by the operator for inputting information, a display unit 24, for example, a liquid crystal display element for displaying photographed images of the operator, the communicating mater and the like as well as information such as a telephone number, a photographing apparatus unit 25 comprising the imaging optical system according to the present invention, an antenna 26 for transmitting and receiving communicating ratio waves, a rear surface display unit 27 and a battery 28. In addition, the drawings show an arrangement of component members which is exemplary and not limitative.

What is claimed is:

1. An imaging optical system comprising in order from the object side: a first positive meniscus lens having a convex surface on the object side; an aperture stop; a second negative meniscus lens having a convex surface on the image side; and a third positive lens, wherein an object side surface of said third lens is an aspherical surface having curvature which is lowered toward a marginal portion of the aspherical surface and an image side surface of the third lens is an aspherical surface having curvature which is enhanced toward the marginal portion of the aspherical surface.

2. The imaging optical system according to claim 1 satisfying the following condition (1):

$$-100<(r1r^2/f1)/(r2f^2/f2)<-1 \tag{1}$$

wherein a reference symbol r1r represents a radius of curvature on an image side surface of the first positive lens, a reference symbol r2f designates a radius of curvature on an object side surface of the second negative lens, a reference symbol f1 denotes a focal length of the first positive lens and a reference symbol f2 represents a focal length of the second negative lens.

3. The imaging optical system according to claim 1 or 2 satisfying the following condition (2):

$$0.1 < f1/f < 3.0 \tag{2}$$

wherein a reference symbol f1 represents a focal length of the first positive lens and a reference symbol f designates a focal length of the imaging optical system as a whole.

4. The imaging optical system according to claim 1 satisfying the following condition (3):

$$1.0 < f23/f < 4.0 \tag{3}$$

wherein a reference symbol f23 represents a total focal length of the second lens and the third lens, and a reference symbol f designates a focal length of the imaging optical system as a whole.

5. The imaging optical system according to claim 1 satisfying the following condition (4):

$$-10.0 < f1/f23 < 3.0 \tag{4}$$

wherein a reference symbol f1 represents a focal length of the first positive lens, and a reference symbol f23 designates a total focal length of the second negative lens and the third positive lens.

6. The imaging optical system according to claim 1 satisfying the following condition (5):

$$0.1 < (\nu2-\nu1)/(\nu3-\nu2) < 8.0 \tag{5}$$

wherein reference symbols $\nu1$, $\nu2$ and $\nu3$ represent Abbe's numbers of the first lens, second lens and the third lens respectively.

7. The imaging optical system according to claim 1 satisfying the following condition (6):

$$10° < \alpha < 40° \tag{6}$$

wherein a reference symbol $\alpha$ represents a maximum angle of incidence of a principal ray on an image surface.

8. The imaging optical system according to claim 1, satisfying the following condition (7);

$$0.50[\mu m] < Fno/P[\mu m] < 2.00[\mu m] \tag{7}$$

wherein a reference symbol Fno represents an F-number of the optical system and a reference symbol P designates an interval between picture elements on the image pickup device.

9. The imaging optical system according to claim 1, satisfying the following condition (8);

$$0.02 < ML/TL < 0.33 \tag{8}$$

wherein a reference symbol TL represents a total length of the optical system and a reference symbol ML designates a minimum axial thickness of the plastic lens.

10. An optical apparatus comprising the imaging optical system according to claim 1.

* * * * *